United States Patent [19]

Adachi et al.

[11] Patent Number: 4,609,258
[45] Date of Patent: Sep. 2, 1986

[54] DIODE LASER COLLIMATOR

[75] Inventors: Iwao P. Adachi, Westminster; Yahiko Yamada, San Jose, both of Calif.

[73] Assignee: Joseph W. Price, Newport Beach, Calif.

[21] Appl. No.: 437,793

[22] Filed: Oct. 29, 1982

[51] Int. Cl.[4] ............................................. G02B 27/64
[52] U.S. Cl. .................................................. 350/395
[58] Field of Search ............... 350/395, 286, 287, 420, 350/421, 433

[56] References Cited

U.S. PATENT DOCUMENTS

| | | |
|---|---|---|
| 972,373 | 10/1910 | Hebig . |
| 1,918,488 | 7/1933 | Rackett . |
| 2,403,731 | 7/1946 | MacNeille . |
| 2,669,902 | 2/1954 | Barnes . |
| 2,697,380 | 12/1954 | Wyser . |
| 2,816,480 | 12/1957 | Tushinsky et al. . |
| 3,437,951 | 4/1969 | Dailey . |
| 3,833,289 | 9/1974 | Schuler . |
| 4,084,883 | 4/1978 | Eastman et al. . |
| 4,173,036 | 10/1979 | Ferguson . |
| 4,312,570 | 1/1982 | Southwell ............... 350/395 X |
| 4,333,173 | 6/1982 | Yonezawa et al. ............... 350/286 |
| 4,367,921 | 1/1983 | Sawamua et al. ............... 350/395 X |

OTHER PUBLICATIONS

Rybakov et al., "Population Properties of Multilayer Dielectric Mirrors", Optics & Spectroscopy, vol. XXV, No. 4, Oct. 1968.

Primary Examiner—John K. Corbin
Assistant Examiner—Vincent J. Lemmo
Attorney, Agent, or Firm—Price, Gess & Ubell

[57] ABSTRACT

A diode laser beam collimator is disclosed which is adapted to polarize and correct the characteristic oval shape of a diode laser beam to a circular shape. The preferred embodiment comprises a prism whose apex angle is selected in accordance with the beam intensity distribution to be corrected. A multilayer dielectric coating on one face of the prism polarizes the beam. The coating comprises alternating layers of low and high refraction index material, whose refractive indices are cooperatively selected with that of the prism material and apex angle.

17 Claims, 7 Drawing Figures

DIODE LASER COLLIMATOR

BACKGROUND OF THE INVENTION

1. Field of the Invention

This invention relates to semiconductor lasers, and more particularly to devices for polarizing and compensating the laser beam for nonuniform intensity distributions.

2. Description of the Prior Art

In recent years, semiconductor laser devices have become of increasingly greater commercial interest. For many applications of semiconductor lasers, it is necessary that the light beam generated by the laser have a substantially circular cross-section. One example of such an application is the optical disk wherein information is recorded on a disk at high density. To record or play the information back, a light beam from the semiconductor laser device must be formed into a light spot of about 1 micron in diameter on the disk. In general, however, the semiconductor laser has a rectangular light emitting region. The collimated beam will, however, have a nonuniform intensity distribution, having an oval or elliptical shape. The characteristics of the ellipse will depend upon the particular semiconductor laser. In order to efficiently store or accurately retrieve information from an optical disk, it is desirable to correct the oval shaped intensity distribution of the beam to a circular distribution.

It is also desirable for the laser beam to be polarized to minimize "backtalk" or interference caused by reflected radiation.

U.S. Pat. No. 4,084,883 discloses a mirror system on a laser material for polarizing laser radiation. Laser material, for example, neodymium doped glass is coated with twenty-five thin film layers of alternately a high-index and a low-index refraction material of a quarter-wavelength optical thickness. The low-index material is suggested as silicon dioxide and the high-index material is suggested to be within the range of 2.0-2.2 such as titanium dioxide (column 3, lines 48-60 and column 5, lines 6-45). A phase adjustor of one or several layers is then mounted on top of the multilayer coating and finally a reflector, which again can consist of multiple layers of thin coating, is deposited on the phase adjustor.

U.S. Pat. No. 4,173,036 discloses the use of a "wavy" mirror to reflect a beam from a laser diode in a thin conical fan distribution of uniform intensity.

U.S. Pat. No. 4,312,570 patent discloses the use of high- and low-optical quarter-wave coating on a reflective surface to provide polarization of reflected light.

U.S. Pat. No. 2,669,902 discloses the use of cemented 45° prisms with quarter-wavelength coatings to provide a polarizing beam splitter.

One known quarter-wavelength multiple layer polarizer utilizes a low refractive index material ($N_L = 1.38$) and a high refractive index material of ($N_H = 2.3$), typically $Z_nS$. As the number of layers increases, however, the degree of reflection of the TM mode of the incident laser radiation increases, reducing the efficiency of the polarizer.

None of the prior art known to applicant discloses an efficient, compact coated prism arrangement which serves to polarize and correct the nonuniform intensity distribution of semiconductor laser beams.

SUMMARY OF THE INVENTION

It is accordingly an object of the present invention to provide a semiconductor laser beam collimator which corrects the beam intensity nonuniformity.

It is another object of the present invention to provide a semiconductor laser beam collimator which polarizes the beam for transmission only of the TM mode of the laser beam.

It is further an object of the present invention to provide a collimator comprised of a pair of prisms, and wherein the beam is polarized by a series of alternating quarter-wavelength layers of dielectric materials having respectively high and low refractive indexes.

It is another object of the present invention to provide a semiconductor laser beam collimator having a polarizer adapted to maximize transmission efficiency of the polarized radiation.

These and other objects of the present invention are accomplished by the preferred embodiment of the invention disclosed herein. The invention comprises the combination of a prism having a plurality of quarter-wavelength dielectric layers formed on one surface. The apex angle of the prism is selected in accordance with the particular beam intensity distribution characteristics to be corrected. The dielectric layers have alternating high and low indices of refraction. The dielectrics are selected so as to increase the reflectance of the TE mode of the incident radiation, while at the same time maximizing the transmission of TM mode energy. The low refractive index is in the range 1.38 to 1.46, and the high refraction index is in the range 1.6 to 1.85.

Other objects, features and improvements will be apparent from the following description and the drawings referenced herein.

DETAILED DESCRIPTION OF THE INVENTION

The present invention comprises an improved semiconductor laser beam collimator, adapted to polarize and correct the nonuniform intensity distribution of the laser beam. The following description of the invention is provided to enable one skilled in the art to make and use the invention, and sets forth the best mode contemplated by the inventors of carrying out their invention. Various modifications, however, will be readily apparent to those skilled in the art, and the generic principles defined herein may be applied to other embodiments. Thus, the present invention is not intended to be limited to the embodiment shown, but is to be accorded the widest scope consistent with the novel principles and features described herein.

Diode lasers generate laser beams having an elliptical cross-sectional configuration, due to the geometry of the device. To maximize the efficiency of the laser for applications requiring a circular laser beam, such as optical memory disk applications, it is necessary to correct the elliptically shaped beam into a circular beam. It is known in the art to use prisms to accomplish this correction.

It is also desirable to polarize the laser beam in order to prevent "backtalk," i.e., interference with the laser output caused by reflected laser energy. Backtalk causes fluctuations in the laser intensity. Intensity fluctuation of semiconductor lasers is inherently a serious problem. Additional fluctuations caused by backtalk therefore aggravate this problem. Polarization of the laser beam allows for complete blocking of reflected polarization, through the use of 90° optical retarders, as is well known.

In the present invention, the desired goals of beam polarization and intensity distribution correction are accomplished by the combination of a prism coated with a plurality of alternating thin coatings of high refraction index material and low refraction index material. To maximize the efficiency of the multi-layer polarizer, there is cooperation between the selected refractive indices for the prism and coatings.

Figure 1:
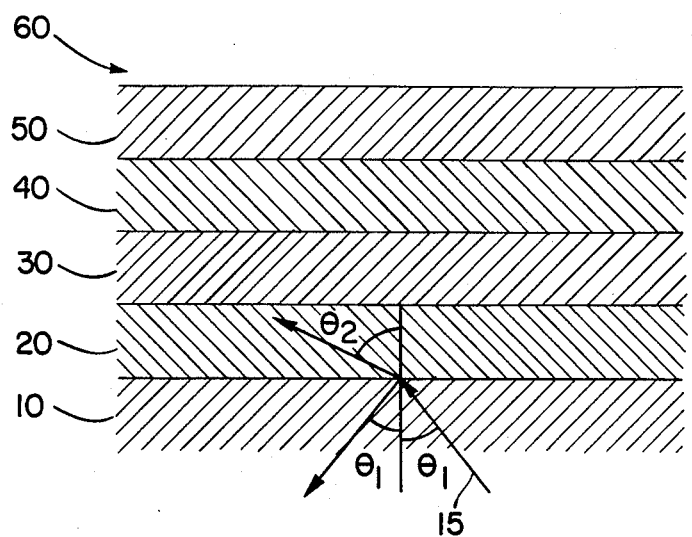
FIG. 1 is a drawing illustrating a multi-layer dielectric coating formed on a substrate.

To aid in understanding the present invention, the refractive properties of a multilayer filter and a prism will briefly be described. Referring now to FIG. 1, an illustration of a multi-layer coating on a glass substrate is shown to illustrate the refractive properties of interfaces between materials having different refractive indices. Substrate 10 is a glass material having refractive index $N_1$. Layers 20, 30, 40 and 50 comprise coatings having refractive indices $N_2$, $N_3$, $N_4$ and $N_5$, respectively. Reference numeral 60 indicates air with a refractive index $N_6$.

A portion of light ray 15, incident through substrate 10 on the $N_1$-$N_2$ interface at angle $\theta_1$, will be transmitted through the interface at angle $\theta_2$. In general, for a ray incident upon an interface between two materials having respective refractive indices $N_1$ and $N_2$ at an angle $\theta_1$ from normal, the magnitudes of the transmitted TM and TE modes of ray 15 are governed by the following relationships:

$$T_{te} = \frac{2 N_1 \cos \theta_1}{N_2 \cos \theta_1 + N_1 \cos \theta_2} \quad \text{Eq. 1}$$

$$T_{tm} = \frac{2 N_1 \cos \theta_1}{N_1 \cos \theta_1 + N_2 \cos \theta_2} \quad \text{Eq. 2}$$

The relative magnitudes of the reflected TM and TE modes of ray 15 are governed by the following relationships:

$$R_{tm} = \frac{\tan (\theta_1 - \theta_2)}{\tan (\theta_1 + \theta_2)} \quad \text{Eq. 3}$$

$$R_{te} = \frac{\sin (\theta_1 - \theta_2)}{\sin (\theta_1 + \theta_2)} \quad \text{Eq. 4}$$

Similar relationships govern transmission through the coating interfaces, with the appropriate refractive indices replacing $N_1$ and $N_2$ in Equations 1 and 2. Taking the special case of light incident from the air 60 to $N_6$ interface at the Brewster's angle, the sum of $\theta_1$ and $\theta_2$ will equal 90°, tan $\theta_1$ equals $N_5$, and $R_{tm}$ will be zero. Assuming that $N_5$ is 1.5, 15.5% of the TE mode energy will be reflected.

Figure 2:
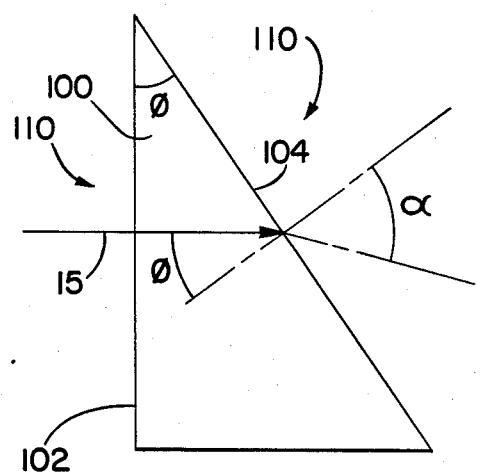
FIG. 2 is a diagram illustrating the refractive characteristics of a prism.

FIG. 2 illustrates laser beam 15 incident upon a prism 100, having refractive index N. Reference numeral 110 indicates air surrounding the prism. Surface 102 is normal to the direction of incidence of the laser beam, so that no polarization occurs due to the incidence of the beam on surface 102.

Incidence of the transmitted beam at surface 104 at angle $\phi$ from the normal direction does result in polarization. In the case where $\phi$ is the Brewster's angle, tan $\phi = N$, and there is no reflection of the TM mode of the incident laser beam. With $N=1.5$, the TE mode will suffer a 15.5% reflection loss. If the laser intensity ratio $p(=TM/TE)$ of the incident radiation of the two vibrational mode is 50, the resultant ratio through the prism arrangement of FIG. 2 will be 67. Thus, while there is some polarizing effect of the prism-air interface, the effect is not large.

The goal for beam polarization efficiency is to obtain a laser intensity ratio $p > 200$, with efficient transmission of the TM mode of the incident radiation. When a single layer coating of $MgF_2$ having an optical thickness of one-quarter wavelength of the laser beam is applied, a drop in the polarization ratio to 54 will result. To achieve higher polarization ratios, multiple one-quarter wavelength layers $(L,H)^N$ of coatings having alternating low and high refractive indices are applied to increase the reflectance of the TE mode, while at the same time maximizing transmission of the TM mode.

Figure 5:
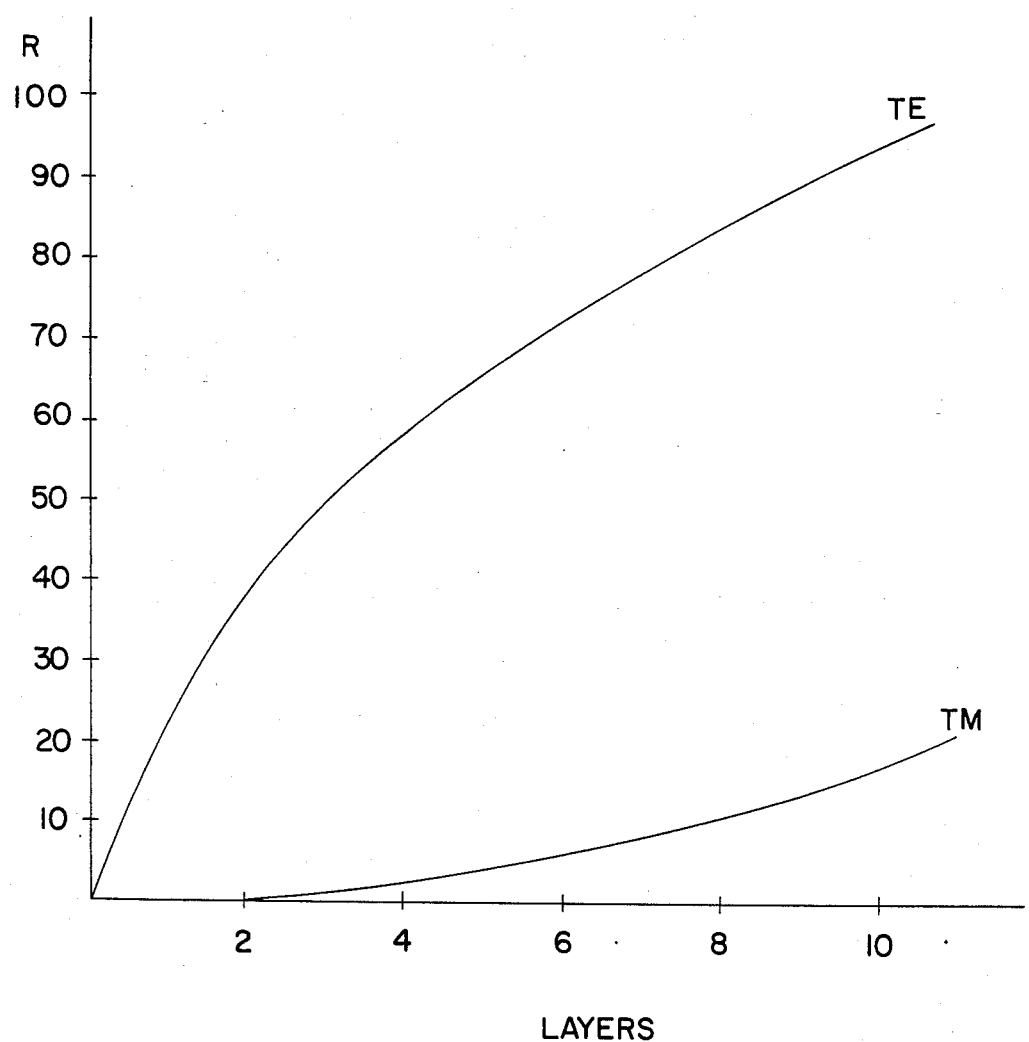
FIG. 5 is a graph illustrating the reflectance of the TE and TM modes of a wave as a function of the number of layers of a dielectric coating.

As the number of layers increases, the reflectance of the TM mode will also increase. With the increase in the reflectance of the TM mode, the total transmission efficiency of the polarizer decreases. FIG. 5 illustrates the reflectance as a function of the number of layers in the filter for the case where the angle of incidence from air into the high refractive index material is 59°, $N_H=1.65$, $N_L=1.38$, the index of refraction of the substrate is 1.6355, and the wavelength of the laser radiation is 0.8 of the design wavelength of the filter.

The improvement in the polarization of the laser beam by the multiple layer arrangement may be examined analytically. The degree of polarization P may be defined by the following relationship:

$$P = \frac{I_{max} - I_{min}}{I_{max} + I_{min}} \quad \text{Eq. 5}$$

where
$I_{max}$=maximum directional intensity of polarized radiation
$I_{min}$=minimum directional intensity of polarized radiation Thus, for perfect polarization, $I_{min}$=zero, and P=1. For a partially polarized beam, $0 < P < 1$. A polarization figure of merit F is defined by the relationship $$F = (P) \times (I_{max}). \quad \text{Eq. 6}$$

If a polarizing filter is used m times, $$P_m = \frac{I_{max}^m - I_{min}^m}{I_{max}^m + I_{min}} \quad \text{Eq. 7}$$

As an example, when the laser beam is incident at the Brewster's angle to an optical surface of a material having a refraction index of 1.5, then the relationships of Table 3 are obtained:

TABLE 3

|  | TE | TM | P | F |
|---|---|---|---|---|
| Reflection | 15.5% | 0 | 1 | 0.155 |
| Transmission | 84.5% | 100% | .4 | 0.4 |

The goal for good polarization is to attain $P>0.8$, $I_{max}>0.8$ and $F>0.64$, with reasonable production costs.

The data in Table 4 is obtained using a multi-layer $(L,H)^3$ polarizing filter disposed on a surface of a prism, with $N_L=1.45$, $a=N_H/N_L$, $Ng=1.516$, the angle of incidence is 60°, with the incident wavelength$=0.8$ $\lambda_o$, the design wavelength, and with $N_H$ variable.

TABLE 4

| | ONE PRISM | | | | TWO PRISMS | | |
|---|---|---|---|---|---|---|---|
| $N_H$ | TE % | TM % | $P_1$ | F | TM % | $P_2$ | F |
| 1.1 | 1.595 | 50.9 | 98.9 | 0.32 | 0.316 | 97.8 | 0.58 | 0.567 |
| 1.2 | 1.74 | 30.4 | 93.2 | 0.51 | 0.475 | 86.9 | 0.81 | 0.70 |
| 1.275 | 1.85 | 23 | 89 | 0.59 | 0.524 | 79.2 | 0.87 | 0.689 |
| 1.3 | 1.885 | 19 | 84 | 0.64 | 0.535 | 70.6 | 0.90 | 0.637 |
| 1.4 | 2.03 | 12 | 73 | 0.71 | 0.518 | 53.3 | 0.95 | 0.506 |

From Table 4, it is apparent that, for the two-prism arrangements discussed more fully hereinbelow, the ranges for $a=1.2\approx1.275$ and $N_H=1.74\approx1.85$ provide optimal polarization ratios and polarization figures of merit.

When one uses a prism material of higher refractive index, for example $Ng=1.6355$, and with $N_L=1.38$, the incident wavelength is 0.8 $\lambda_o$ and the angle of incidence is 59°, the data shown in Table 5 is obtained:

TABLE 5

| a | $N_H$ | TE | TM | P | F |
|---|---|---|---|---|---|
| 1.2 | 1.65 | 26 | 94 | 0.56 | 0.526 |
| 1.23 | 1.7 | 21 | 91 | 0.625 | 0.568 |
| 1.34 | 1.85 | 15 | 90 | 0.71 | 0.64 |
| 1.66 | 2.3 | 4 | 30 | 0.76 | 0.229 |

From the data in Tables 4 and 5, the optimal range of the ratio of the high and low refractive indices ($N_H/N_L$) of the multilayer coating is $1.2<N_H/N_L<1.35$, depending upon the value of the refractive index of the glass.

For the case in which the angle of incidence of the light on the coating-air-glass $(N_{L,H})^3$ interface is 59°, $N_L=1.38$, $N_H=1.65$, and $N_{glass}=1.6355$, then the angle of refraction through the respective interfaces may be calculated (using Snell's law) and is set forth in Table 6.

TABLE 6

| R(1) = 1 | AN(1) = 59° |
|---|---|
| R(2) = 1.65 | AN(2) = 31.30° |
| R(3) = 1.38 | AN(3) = 38.40° |
| R(4) = 1.65 | AN(4) = 31.30° |
| R(5) = 1.38 | AN(5) = 38.40° |
| R(6) = 1.65 | AN(6) = 31.30° |
| R(7) = 1.38 | AN(7) = 38.40° |
| R(8) = 1.6355 | AN(8) = 31.61° |

While the thickness of the coatings is calculated to be one optical quarter wavelength at the design wavelength $\lambda_o$, the optimum polarization is achieved for incident radiation which is not precisely at $\lambda_o$. The optical thicknesses for each layer is $(t)(n)(\cos\theta)$, for the TE mode, and $(t)(n)(1/\cos\theta)$ for the T.M. mode, where t is the physical thickness, n is the refractive index of the layer and $\theta$ is the incident angle of the light from normal incidence. This phenomenon is more fully discussed in the textbook "Principles of Optics," by Max Born and Emil Wolf, Fifth Edition 1976, Pergamon Press, at page 61 et seq.

When $\theta$ is zero, $\cos\theta=1$, and the optical thickness is reduced to $(t)(n)$. In this case, there is no difference in the optical thickness for the TE and TM modes.

When $\theta$ increases from zero, the values of $\cos\theta$ and $1/\cos\theta$ changes, providing different reflectance values of the TE and TM modes, thereby polarizing the beam. For an incident angle of about 60°, the peak refractance for the TE mode shifts to about 0.8 $\lambda_o$. For smaller angles of incidence, the shift is less. This phenomenon is illustrated in Table 7, which lists the percentage of the reflected TE and TM modes as a function of the normalized incident radiation, where a normalized wavelength of 1.0 is the design wavelength at which the coating optical thickness is calculated, $\lambda_o$.

TABLE 7

| NORMALIZED WAVE LENGTH | TE WAVE % | REFLECTANCE TM WAVE % | AVERAGE % |
|---|---|---|---|
| .5 | 10.995 | .402 | 5.698 |
| .6 | 19.794 | .777 | 10.286 |
| .7 | 25.195 | 2.431 | 13.813 |
| .8 | 83.028 | 11.832 | 47.430 |
| .9 | 74.277 | 8.145 | 41.211 |
| 1.0 | 20.745 | 1.694 | 11.230 |
| 1.1 | 18.705 | 3.678 | 9.353 |
| 1.2 | 28.893 | .438 | 14.666 |
| 1.3 | 20.760 | .655 | 10.708 |
| 1.4 | 12.112 | .450 | 6.281 |

From Table 7, it may be seen that, for an angle of incidence of about 60°, maximum polarization of the incident radiation is achieved by a normalized wavelength of 0.8. At this value, while there is an 11.8% loss of energy in the TM mode, the (desired) loss of energy of the TE mode is 83%.

Materials which are appropriate for the low refractive index material of the preferred embodiment are $MgF_2$ and $SiO_2$. Materials which are appropriate for the high refractive index material of the preferred embodiment are $CeF_2$, $Al_2O_3$, $MgO$ and $Z_rO_2$.

The prism can, as is known, be used to compensate for the elliptical shape of the laser beam generated by a diode laser. If it is assumed that the major and minor axis of the beam ellipse has the relationship M:1, it is necessary to compensate the major axis by a factor of 1/M to result in a ratio of 1:1, or a circular beam.

Figure 3:
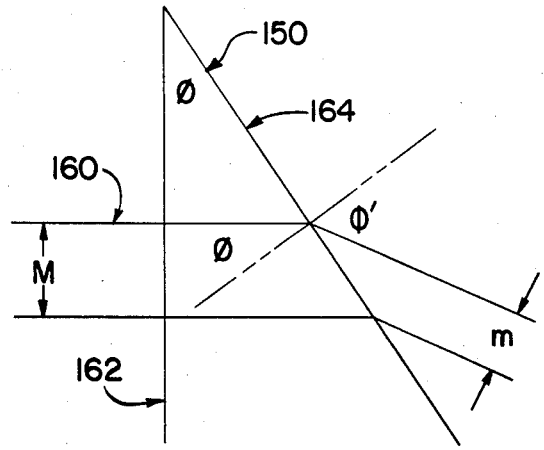
FIG. 3 is a diagram illustrating the intensity distribution correcting characteristics of a prism.

Referring now to FIG. 3, an elliptical laser beam 160 having a major axis width of unity is incident upon prism 150 having refractive index N. The apex angle of the prism is $\theta$. The beam enters the prism at surface 162 at an angle of 90°, and is incident on surface 164 at angle $\theta$. Due to refraction, the beam leaves surface 164 at angle $\theta'$. $\theta'$ is related to $\theta$ by the following expression:

$$n \sin\theta = \sin\theta'. \quad \text{Eq. 8}$$

If the beam has unity width entering the prism, and width m exiting surface 164, then $$m = \frac{\cos[\sin^{-1}(N \sin \theta)]}{\cos \theta} \quad \text{Eq. 9}$$

The minor axis is incident upon the prism in a direction parallel to the surfaces through which the beam passed, and is not affected by the prism.

Figure 4:
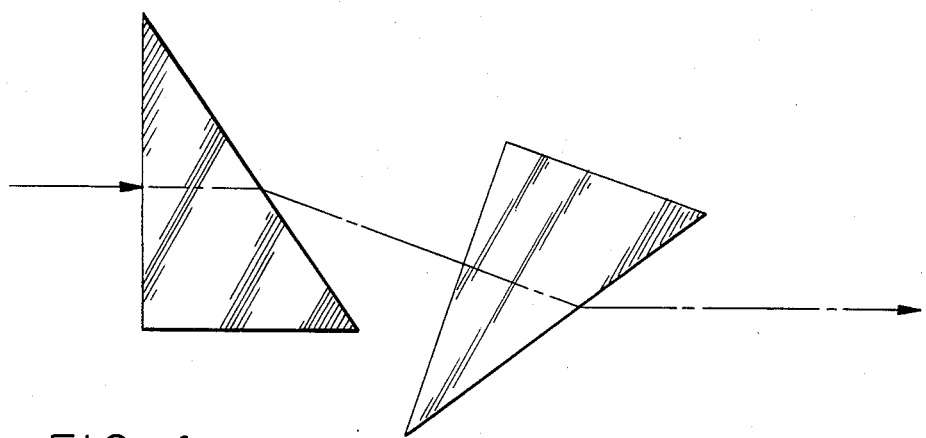
FIG. 4 is a diagram illustrating the refractive properties of a two-prism arrangement.

If two identical prisms are used in order to have the corrected beam parallel to the incident beam, the effect of the two lasers on the incident wave shape will be 1:m². (This two-prism arrangement is illustrated in FIG. 4.) Thus, to correct an incident beam of width m to unity using a two-prism arrangement, $$m = \frac{1}{\sqrt{M}} \quad \text{Eq. 10}$$

As an example of this correction, assume the ratio of the major and minor axis of the incident beam is 14:5.6. The correction factor is 0.4, i.e. 5.6/14. Hence $m = \sqrt{0.4} = 0.632$, with $\theta = 30°$, $N = 1.67$ and $\theta' = 56.6°$.

Table 8 illustrates the dependence of the correction factor m on the prism apex angle $\theta$, when using BK7 with refractive index of 1.5 as the prism material.

TABLE 8

| $\theta$ | $\theta'$ | m | m² |
|---|---|---|---|
| 30° | 48.6° | 0.764 | 0.584 |
| 33° | 54.8° | 0.688 | 0.473 |
| 34° | 57.0° | 0.657 | 0.432 |
| 35° | 59.4° | 0.622 | 0.386 |

Table 9 illustrates the dependence of the correction factor m on the magnitude of the refractive index of the prism material, with a fixed apex angle $\theta$ of 30°.

TABLE 9

| N | $\theta'$ | m | m² |
|---|---|---|---|
| 1.5 | 48.6° | 0.764 | 0.584 |
| 1.6 | 53.1° | 0.693 | 0.480 |
| 1.64 | 55.1° | 0.661 | 0.437 |
| 1.7 | 58.2° | 0.608 | 0.370 |

The compensation factor is sensitive to variations both in the apex angle and the refractive index of the prism material, as shown in Tables 8 and 9. Using a high refractive index prism material results in better polarization, and a prism material with a relatively high refractive index is suited to the invented beam collimator. The prism apex angle is therefore the preferable parameter to be adjusted in dependence upon the particular elliptical characteristic to be compensated.

Figure 6:
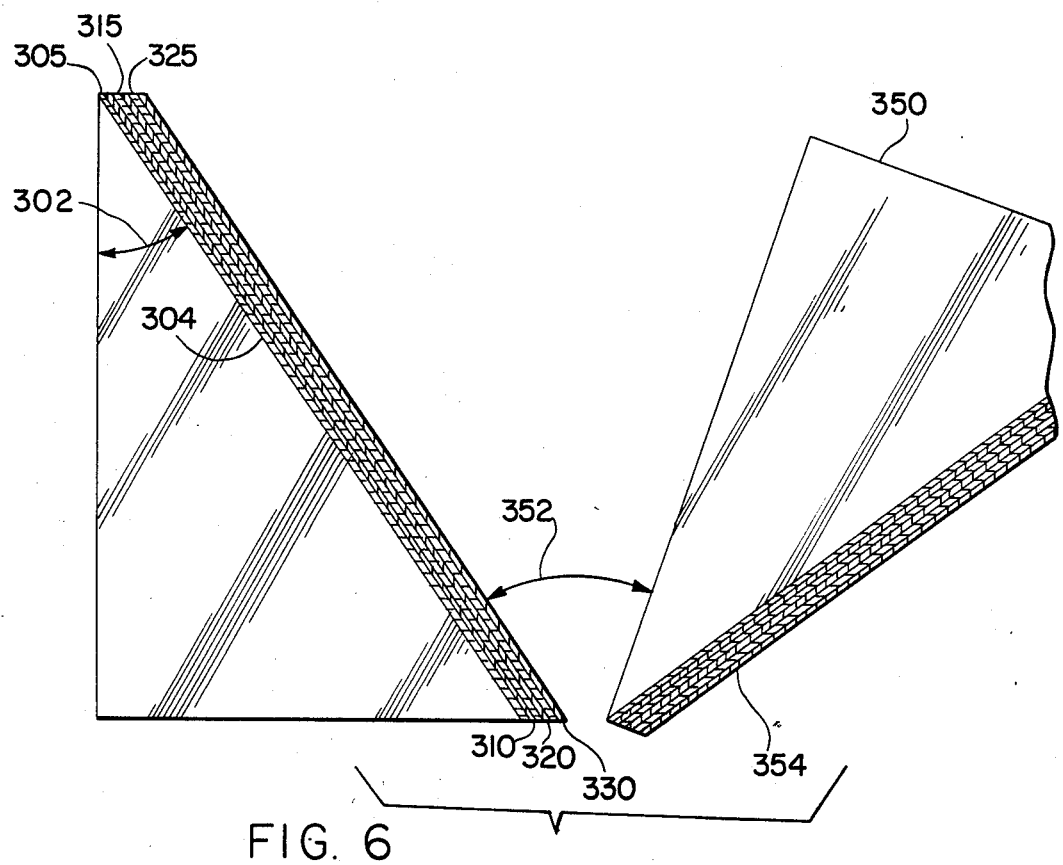
FIG. 6 is a diagram illustrating the preferred embodiment of the invention.

The above-described principles are applied to produce the beam collimator/polarizer shown in FIG. 6. Prisms 300 and 350 are prisms, having equal respective apex angles 302 and 352 of 30°. An (L,H)³ multilayer coating is applied to each of surfaces 304 of prism 300 and 354 of prism 350. It has been found that six layers provide optimum efficiency for the polarizer.

The coating thicknesses are designed for a one micron wavelength, and each has a depth of one optical one-quarter wavelength. The low refractive index material comprises MgF₂ ($N_L = 1.38$), and the high refractive index material comprises AlO₃ ($N_H = 1.65$). Since one-quarter of a micron is 250 nanometers, an optical one-quarter wavelength for MgF₂ is 250/1.38 or 181.15 nanometers, and for AlO₃ is 250/1.65 or 151.5 nanometers. Thus, the total thickness for the six-layer coating shown in FIG. 6 is 3(181.15 + 151.5), or about 998 nanometers, approximately one micron.

For an eight layer coating, the total thickness is 4(181.15 + 151.5), or 1330.6 nanometers. Very high precision in forming the layers would be required to avoid the so scattering, which phenomenon destroys the polarization. Thus, while theoretically an eight-layer structure should provide higher polarization than a six-layer structure, in practice inferior polarization efficiency is observed.

Although the (¼; ¼) repeated multilayer is a basic and preferred structure, it is not necessary to the practice of the invention. Non-quarter wavelength structures can also be used. See U.S. Military Handbook, MIL-HDBK-141, by P. Baumeister, at page 20-91. For the polarizing filter, the number of layers controls the overall polarization. For example, (¼; 0.7/0.4) or (¼; ¾) multilayer structures can be utilized. The important feature is the alternate multilayer structure.

The apex angles of the prisms 300 and 350 will be selected in dependence upon the oval intensity distribution of the particular diode laser, as discussed hereinabove.

Figure 7:
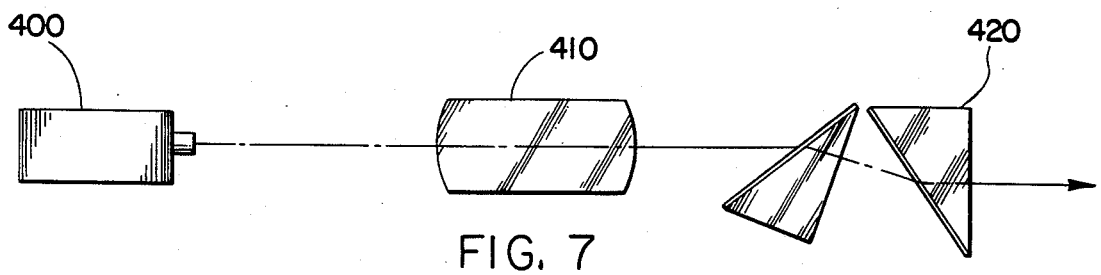
FIG. 7 is a diagram illustrating the typical arrangement to which the invention is adapted.

A typical arrangement in which the invented collimator is used is shown in FIG. 7. A conventional collimating lens 410 is disposed between diode laser 400 and the collimator 420 of the present invention. With the two-prism arragement, the polarized laser beam out of collimator 420 will be parallel to the collimated beam out of the lens 410.

While the above discloses the preferred embodiments of the present invention, it should be understood that various modifications are possible within the scope of this invention by workers skilled in the art and accordingly the invention should be measured solely from the following claims.

What is claimed is:

1. A semiconductor laser beam prism polarizer for polarizing and correcting an emitted laser beam from a semiconductor laser to a circular cross-section, comprising:
   prism means for correcting an incident laser beam into a beam having a substantially circular cross-section; and
   polarizing means comprising a plurality of alternating layers of materials having high and low refractive indices, respectively, said layers being disposed on a surface of said prism means through which said laser beam passes, and wherein the ratio of said high refractive index to said low refractive index is in the range 1.2 to 1.35, said prism means has an apex angle ($\theta$) selected to correct said incident laser beam having an elliptically shaped cross-section with a major axis M and a minor axis S, and said apex angle is related to the characteristics of said incident laser beam by the relationship $$m = \frac{\cos[\sin^{-1}(N \sin \theta)]}{\cos \theta},$$

where N = refractive index of the prism material, and m is the correction factor S/M.

2. The prism polarizer of claim 20 wherein said low refractive index material has a refractive index in the range 1.38 to 1.46, and said high refractive index material has a refractive index in the range 1.6 to 1.85.

3. The prism polarizer of claim 2 wherein said low refractive index material is one of the group comprising $MgF_2$ and $SiO_2$.

4. The prism polarizer of claim 3 wherein said high refractive index material is one of the group comprising $CeF_2$, $Al_2O_3$, MgO and $ZrO_2$.

5. The prism polarizer of claim 4 wherein said plurality of layers of material comprises six layers.

6. A semiconductor laser beam prism polarizer for polarizing and correcting an emitted laser beam from a semiconductor laser to a circular cross-section, comprising:

prism means for correcting an incident laser beam into a beam having a substantially circular cross section; and polarizing means comprising a coating of a plurality of alternating layers of materials having high and low refractive indices, respectively, said layers being disposed on a surface of said prism means through which said laser beam passes, and wherein the ratio of said high refractive index to said low refractive index is in the range 1.2 to 1.35, said prism means is adapted to correct said incident laser beam having an elliptically shaped cross-section with a major axis M and minor axis S, and comprises first and second prisms, said laser beam is incident upon a first surface of said first prism, said coating is disposed on a second surface of said first prism disposed at an apex angle A with respect to said first surface, said second prism being disposed such that said laser beam transmitted through said second surface of said first prism is incident upon a first surface of said second prism, said first surface and a second surface of said second prism being disposed at said apex angle A, and where said apex angle is related to the characteristics of the incident beam by the relationship $$m^2 = \frac{\cos[\sin^{-1}(N \sin A)]}{\cos A},$$

where N equals the refractive index of the first and second prism material, and m is the correction factor S/M.

7. The prism polarizer of claim 6 wherein said low refractive index material has a refractive index in the range 1.38 to 1.46, and said high refractive index material has a refractive index in the range 1.6 to 1.85.

8. The prism polarizer of claim 6 wherein said low refractive index material is one of the group comprising $MgF_2$ and $SiO_2$.

9. The prism polarizer of claim 6 wherein said high refractive index material is one of the group comprising $CeF_2$, $Al_2O_3$, MgO and $ZrO_2$.

10. The prism polarizer of claim 6 wherein said plurality of layers of material comprises six layers.

11. A semiconductor laser beam prism polarizer for polarizing and correcting incident laser radiation in the form of an emitted laser beam from a semiconductor laser to a circular cross-section, comprising:

prism means for correcting the beam into a beam having a substantially circular cross-section; and polarizing means comprising a coating of a plurality of alternating layers of materials having high and low refractive indices, respectively, said layers being disposed on a surface of said prism means through which said laser beam passes to form a prism polarizer of a predetermined design wavelength, and wherein the ratio of said high refractive index to said low refractive index is in the range 1.2 to 1.35 and the ratio of the wavelength of said incident laser radiation to the design wavelength of said prism polarizer is about 0.8.

12. The prism polarizer of claim 11 wherein said low refractive index material has a refractive index in the range 1.38 to 1.46, and said high refractive index material has a refractive index in the range 1.6 to 1.85.

13. The prism polarizer of claim 12 wherein said low refractive index material is one of the group comprising $MgF_2$ and $SiO_2$.

14. The prism polarizer of claim 12 wherein said prism means has an apex angle ($\theta$) selected to correct an incident laser beam having an elliptically shaped cross-section with a major axis M and a minor axis S, and the apex angle is related to the characteristics of the incident beam by the relationship $$m = \frac{\cos[\sin^{-1}(N \sin \theta)]}{\cos \theta},$$

where N=refractive index of the prism material, and m is the correction factor S/M.

15. The prism polarizer of claim 13 wherein said high refractive index material is one of the group comprising $CeF_2$, $Al_2O_3$, MgO and $ZrO_2$.

16. The prism polarizer of claim 14 wherein said plurality of layers of material comprises six layers.

17. The prism polarizer of claim 15 wherein said prism means is adapted to correct an incident laser beam having an elliptically shaped cross-section with a major axis M and a minor axis S, and comprises first and second prisms, said laser beam is incident upon a first surface of said first prism, said coating is disposed on a second surface of said first prism disposed at an apex angle A with respect to said first surface, said second prism being disposed such that said laser beam transmitted through said second surface of said first prism is incident upon a first surface of said second prism, said first surface and a second surface of said second prism being disposed at said apex angle A, and where said apex angle is related to the characteristics of the incident beam by the relationship $$m^2 = \frac{\cos[\sin^{-1}(N \sin A)]}{\cos A},$$

where N=refractive index of the first and second prism material, and m is the correction factor S/M.

* * * * *

UNITED STATES PATENT AND TRADEMARK OFFICE
CERTIFICATE OF CORRECTION

PATENT NO. : 4,609,258
DATED : September 2, 1986
INVENTOR(S) : Iwao P. Adachi, et al It is certified that error appears in the above-identified patent and that said Letters Patent is hereby corrected as shown below:

Column 8, line 65, delete "20" and insert --1--.

Signed and Sealed this

Twenty-seventh Day of January, 1987

Attest:

DONALD J. QUIGG

Attesting Officer      Commissioner of Patents and Trademarks